United States Patent [19]  
Takeuchi et al.

[11] 3,877,541  
[45] Apr. 15, 1975

[54] ELECTRONIC SAFETY ASSURANCE SYSTEM FOR AN AUTOMOTIVE VEHICLE
[75] Inventors: Yasuhisa Takeuchi, Yokosuka; Takayuki Yanagishima, Yokohama, both of Japan
[73] Assignee: Nissan Motor Company, Limited, Yokohama, Japan
[22] Filed: Jan. 31, 1974
[21] Appl. No.: 438,363

[30] Foreign Application Priority Data  
Feb. 3, 1973 Japan.............................. 48-13394

[52] U.S. Cl.................................. 180/99; 340/279
[51] Int. Cl............................................ B60k 27/08
[58] Field of Search........... 180/99, 82 R; 340/52 R, 340/279

[56] References Cited  
UNITED STATES PATENTS
| | | | |
|---|---|---|---|
| 2,848,712 | 8/1958 | Preston............................. | 180/99 X |
| 2,875,430 | 2/1959 | Kayser................................. | 340/279 |
| 3,106,981 | 10/1963 | Chakiris................................ | 180/99 |
| 3,222,639 | 12/1965 | Kayser................................. | 180/99 X |
| 3,222,640 | 12/1965 | Worst................................. | 180/99 X |
| 3,227,998 | 1/1966 | Platt................................... | 180/99 X |

Primary Examiner—David Schonberg  
Assistant Examiner—Terrance L. Siemens

[57] ABSTRACT

A first pulse storage counter is provided for counting a steering oscillation frequency for a predetermined interval when the vehicle speed exceeds a preselected speed to establish a reference count for comparison purposes, clears the reference count at a transition when the vehicle speed exceeds again the preselected speed after it has reduced to a speed level lower than the preselected speed, and starts counting the steering oscillation frequency again to update its content to establish a new reference count. A second pulse storage counter is provided for counting the oscillation frequency at the instant a reference count has been established for the same predetermined interval to establish a second count and updates it repeatedly at the predetermined interval while the reference count remains unchanged until such a transition occurs. The reference and second counts are compared repeatedly at the predetermined interval. When the second count is smaller than the reference count by a predetermined amount, a warning signal will be given to alert the driver.

9 Claims, 2 Drawing Figures

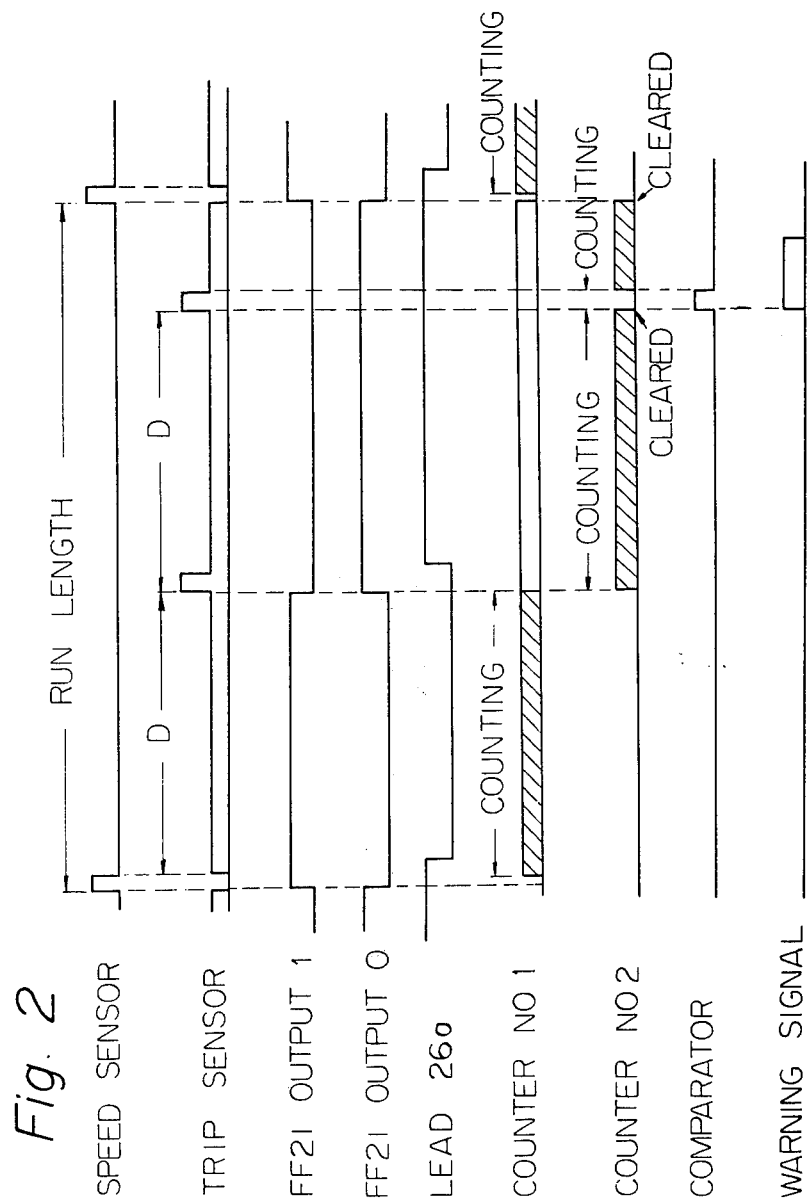

ELECTRONIC SAFETY ASSURANCE SYSTEM FOR AN AUTOMOTIVE VEHICLE

The present invention relates generally to an electronic driving assurance system, and particularly to an improvement to the electronic driving assurance system.

Electronic driving assurance systems are known in the art wherein the oscillations of the steering wheel of a vehicle are converted into a series of pulses that is compared with a reference value of oscillations. If the frequency of oscillations reduces to the reference value, a warning system will be energized to alert the driver. However, the frequency of steering oscillations varies widely with different drivers and it also depends on the physical and psychological conditions of the driver. It further varies with changing roadway conditions and, less frequently, with the vehicle's driving characteristics that vary steadily with time. It is therefore likely that the warning system operates erroneously.

Therefore, it is an object of the present invention to provide an improved driving assurance system wherein variable factors influencing the driving conditions are incorporated in determining the reference steering oscillations in order that the warning system is not operated erroneously.

Another object of the invention is to provide an improved electronic driving assurance system wherein the reference steering oscillations are stored for a predetermined interval from the instant the vehicle is in excess of a preselected speed to the instant the vehicle's speed, once lowered to a level lower than the given speed, again exceeds the preselected speed to establish a fresh reference count for subsequent driving.

In accordance with the present invention there is provided first and second storage devices or counters for comparison purposes: the first counter being used as a reference counter to establish a reference count by counting the steering oscillation frequency during the initial period of each run length ("run length" is defined in this specification as a period which starts at the instant the vehicle's speed is in excess of preselected speed and ends at the instant it rises again to exceed the preselected speed after it has lowered to a speed below the preselected speed) and the second counter being used for counting the steering oscillation frequency after the reference count has been established. A trip sensor is provided which is energized upon the vehicle's speed reaching the preselected speed and provides a trip signal at a preselected interval to enable each of the counters for storing the steering oscillation frequency. After the reference count has been established in the initial period of each run length, the second counter is switched in for storing the oscillation frequency during subsequent period to establish a second count for comparison with the reference count. A comparator is provided to give a warning signal if the second count is smaller than the reference count by a predetermined amount. During the subsequent intervals of the run length, the reference count remains unchanged while the second counter repeatedly clears its content for storing a new oscillation frequency. During a given run length, comparison is therefore repeated until the end of the run length at which the reference count is cleared to establish a fresh reference count for the next run length.

These and other objects and features of the present invention will be better understood from the following detailed description taken in conjunction with the accompanying drawings, in which:

FIG. 2 is a timing diagram of the circuit diagram of FIG. 1.

Figure 1:
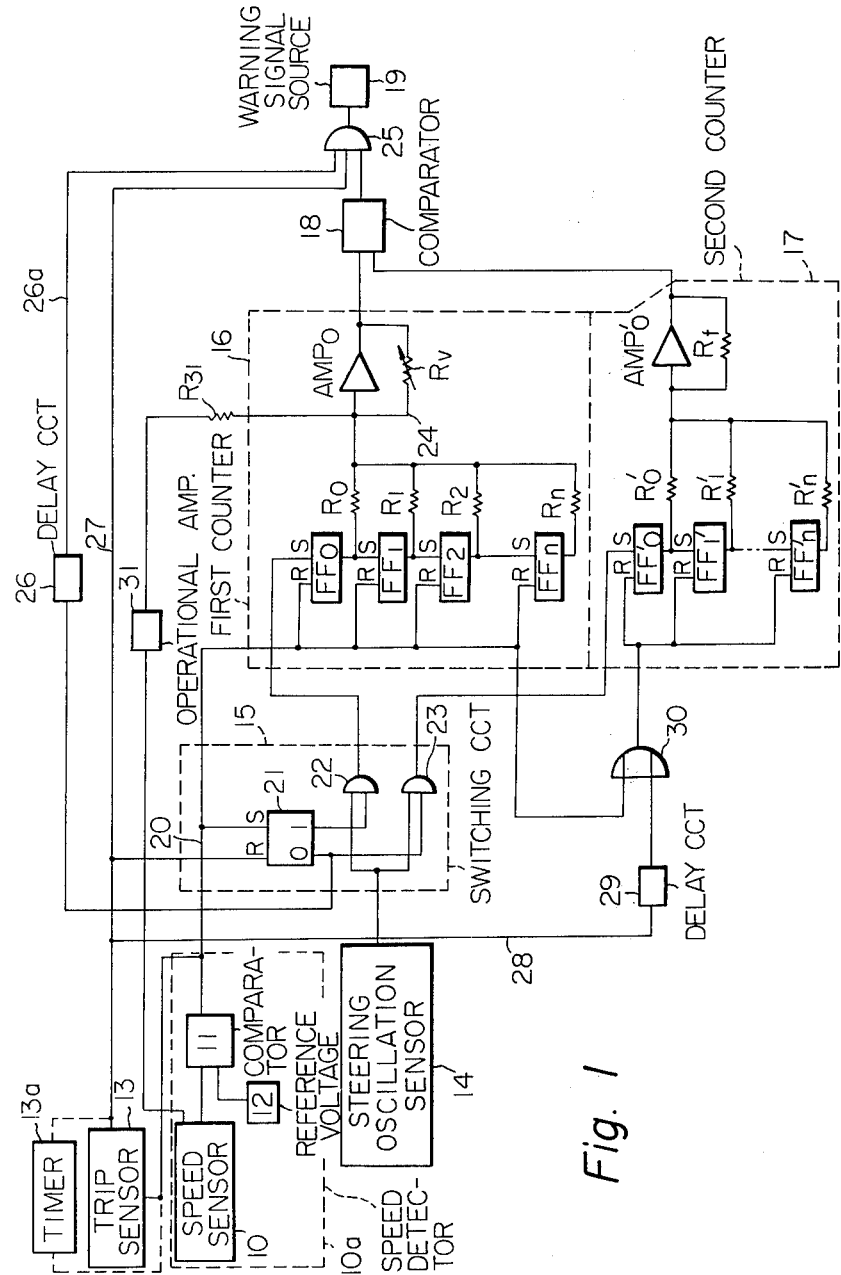
FIG. 1 is a schematic circuit diagram according to the present invention.

With reference to the drawings, particularly to FIG. 1, wherein an electronic safety assurance system for an automotive vehicle embodying the present invention is shown and generally comprises a speed detector 10a including a speed sensor 10, a comparator 11 and a reference voltage source 12, a trip sensor 13, a conventional steering oscillation sensor 14, a switching circuit 15, first and second counters 16 and 17, a comparator 18 and a warning signal source 19. The speed sensor 10 continuously detects the speed of a vehicle equipped with the assurance system and provides a speed signal to the comparator 11 which compares it with a reference signal from the reference voltage source 12. When the vehicle speed has reached a preselected speed level the comparator 11 produces a pulse which is fed into the switching circuit over lead 20. The flip-flop 21 of the switching circuit has its "1" terminal energized to set up a switching path through And gate 22 to the first counter 16 which comprises a plurality of flip-flops $FF_0$ to $FF_n$ in a cascaded connection. These flip-flops are of the reset-preference type and therefore the energization of lead 20 has reset or cleared the contents, if any, of these flip-flops in preparation for the storage of subsequent signals through the And gate 22. The steering oscillation sensor 14 is of a conventional photoelectric type as described in U.S. Pat. No. 3,106,981 wherein an on-off light beam produced by interception of an apertured member provided on the steering wheel in response to the oscillatory movements thereof is converted into pulse-type signal. The pulse-type signal from the steering oscillation sensor 14 is gated through the And gate 22 to the set terminal of the flip-flop $FF_0$ and produces a signal on its output terminal a voltage signal which appears across resistor $R_0$. Subsequent pulses produces corresponding voltage signal across resistors $R_1$ to $R_n$. These resistors have at one end connected to the corresponding output terminal of the flip-flops while connected at the other end in common to a direct-current amplifier $AMP_0$ having a feedback loop 24 which includes a variable resistor $R_r$. These resistors have the following relation: $R_0 = R$, $R_1 = R/2$, $R_2 = R/4$, .... $R_n = R/2^{n-1}$, and $R_r = k R$, wherein is the number of resistors and $k$ is a constant smaller than unity. As the signal is continuously fed into the first counter, the voltage at the output of the amplifier $AMP_0$ increases stepwisely. At the instant the speed detector 10a produces a speed signal, the trip sensor 13 is energized to start measuring the distance D (FIG. 2.) travelled by the vehicle and produces a trip signal when a preselected distance is reached which is fed into the reset terminal of the flip-flop 21 and turns the conduction state of its output terminals. The energization of the 0 terminal enables an And gate 23 to change the switching path to the second counter 17. The first counter ceases its counting operation and the stored count therein is used as a reference count to be compared with that of the second counter. Subsequent pulses from the steering oscillation sensor 14 are gated through the And gate 23 to the second counter. Similarly, the second counter produces at its output a voltage signal which increases stepwisely in response to the input signals. The resistors $R_0'$, $R_1'$ to $R_n'$ and $R_f$ have the same relation as previously described with the exception that $R_f$ is a fixed resistor having a resistance value of R.

As the vehicle continues its driving and a second trip pulse is delivered from the trip sensor 13, the conduction state of the flip-flop 21 remains unchanged, but enables an And gate 25 over lead 27 to gate the output of the comparator 18 to the warning signal source 19. The delay circuit 26 serves to delay the rising and falling edges of the signal on the "0" output terminal of the flip-flop 21 so that upon occurrence of the first pulse from the trip sensor inhibits the And gate 25 to prevent the signal at the output to comparator 18 from being gated, since at this time only the reference count has been stored in the first counter. As soon as the comparator 18 damps its output through the And gate 25, the stored count in the second counter is cleared by a signal on lead 28 delayed by means of a delay circuit 29, while the reference count in the first counter remains uncleared. Subsequent pulses from the steering oscillation sensor 14 are stored in the second counter although subsequent trip pulses are given to the reset terminal of the flip-flop 21 from the trip sensor 13. Therefore, during the period of a run length, the reference count remains unchanged while the second counter repeatedly updates its stored count upon occurrence of the trip signal to repeat comparison in the remaining stage of the run length after the reference count has been established.

When the vehicle slows down and gather its speed again to exceed the preselected speed level, the speed detector 10a produces a second speed signal which clears the reference count as well as the second count. An Or gate 30 serves to reset the second counter 17 on each speed signal. A run length is thus defined as an interval between two transitions or speed pulses, since it is assumed that the occurrence of the speed signals indicate that the driver is not incapacitated nor drowsy. If the driver is incapacitated or become drowsy, the steering oscillation will become less frequent than is expected in the normal driving condition. Therefore, a warning signal is given when the count in the second counter is smaller than the reference count. However, in accordance with the present invention, it is assumed that during the initial period of each run length the driver encounter a new driving or roadway condition and steering operation would tend to become more frequent than is expected in the later stage of the run length. Therefore, the reference count is established by detracting from its actually stored count. The provision of the variable resistor $R_r$ in the first counter is for carrying out this purpose because the resistor $R_r$ has a value of k.R which is smaller than that of $R_f$ by an amount proportional to that value detracted from the actual stored count, so that the comparator 18 produces an output when the second count is smaller than the detracted value of the actual count. The value of constant $k$ is assumed to take a number in the neighborhood of 0.9.

It is understood from the above that the first counter is caused to reset on receipt of a speed signal at each transition of run lengths to establish a fresh reference count, while the second counter is reset on receipt either of a speed signal or a trip signal to repeatedly establish a second count for comparison purposes.

In order to refine the present invention, there is provided an operational amplifier, or a function generator 31 connected between the speed sensor 10 and the input to the d.c. amplifier $AMP_0$. The operational amplifier 31 produces a voltage signal which varies nonlinearly in accordance with the speed value of the vehicle and feeds it to the d.c. amplifier to vary the input voltage thereof. The provision of the operational amplifier is accounted for by the fact that as vehicle's speed rises on a highway, for example, the steering operation would tend to become less frequent than in the roadway condition which would be encountered on busy street of a city area. Therefore, the operational amplifier serves to vary the value of reference count in order to compensate for the less frequent oscillation of the steering wheel under such driving condition to avoid undesirable operation of the system.

Although in the foregoing description, a trip sensor is employed for producing a signal at a preselected distance interval, a timer 13a may be employed for such purposes to produce the signal at a preselected time interval.

Various modifications of the electronic driving assurance system may be apparent to those skilled in the art. For example, the comparator 18 may comprises a plurality of circuits each being operable to a predetermined difference between the signal amplitudes of the first and second counters so that alarm signals will be given in the order of increasing importance. It is also assumed that the steering oscillation would tend to increase as the vehicle's speed increases. Therefore, the system may be modified to produce a signal when the steering oscillation exceeds the reference count as well as the signal given when it is smaller than the reference count as previously described, so that the driver is alerted that the vehicle is driven at a dangerous speed.

Since it is known that the driving ability would start declining 30 to 60 minutes after the start of the driving, the first and second counters may preferably be compared at every 30 to 60 minutes or at equivalent distances travelled. The clearing of the reference count at every occurrence of the trip signal at the above-stated interval would establish a new reference for the later driving which serves to eliminate undesirable operation of the system under varying roadway conditions.

What is claimed is:

1. In a safety apparatus for a vehicle having a steering wheel in which a series of pulses is produced in response to oscillatory movement of said steering wheel and counted for comparison with a reference count to give a warning signal, the improvement comprising:
   a. speed sensing means for producing a first signal when the speed of said vehicle exceeds a preselected value;
   b. means responsive to said first signal for producing a second signal at a preselected interval;
   c. first storage means responsive to said first signal for counting said series of pulses to establish said reference count during the initial period of a given run length;
   d. second storage means responsive to said first and second signals for counting said series of pulses to repeatedly establish a second count during the remaining period of said run length;

e. means responsive to said second signal for comparing said second signal with said reference count to produce an output when said second count is smaller than said reference count; and f. means responsive to said output for giving said warning signal to alert the driver in said vehicle.

2. The improvement of claim 1, wherein said first storage means clears said reference count at each transition of run lengths to establish a fresh reference count.

3. The improvement of claim 1, wherein said reference count is multiplied by a factor less than unity.

4. The improvement of claim 1, wherein said reference count varies in accordance with the speed of said vehicle.

5. The improvement of claim 1, wherein said first storage means comprises a plurality of flip-flops each being connected to each of a plurality of resistors connected to a d.c. amplifier having a feedback loop including a variable resistor.

6. The improvement of claim 5, wherein said plurality of resistors have a resistance value of $R/2^{n-1}$, wherein R is the maximum value of said variable resistor and n is the number of said resistors.

7. The improvement of claim 1, wherein said second storage means comprises a plurality of flip-flops each being connected to each of a plurality of first resistors connected to a d.c. amplifier having a feedback loop including a second resistor.

8. The improvement of claim 7, wherein said plurality of first resistors have a resistance value of $R/2^{n-1}$, wherein R is the value of said second resistor and n is the number of said first resistors.

9. The improvement of claim 5, wherein said first storage means is coupled to said speed sensing means via an operational amplifier.

* * * * *